(12) United States Patent
Chiu et al.

(10) Patent No.: US 7,900,057 B2
(45) Date of Patent: Mar. 1, 2011

(54) CRYPTOGRAPHIC SERIAL ATA APPARATUS AND METHOD

(75) Inventors: Chung-Yen Chiu, Taoyuan County (TW); Shuning Wann, Fremont, CA (US)

(73) Assignee: Enova Technology Corporation, Hsin-Chu (TW)

( * ) Notice: Subject to any disclaimer, the term of this patent is extended or adjusted under 35 U.S.C. 154(b) by 1214 days.

(21) Appl. No.: 11/282,175

(22) Filed: Nov. 18, 2005

(65) Prior Publication Data

US 2006/0117189 A1 Jun. 1, 2006

Related U.S. Application Data

(63) Continuation-in-part of application No. 10/635,833, filed on Aug. 6, 2003, now Pat. No. 7,386,734, which is a continuation-in-part of application No. 09/704,769, filed on Nov. 3, 2000, now Pat. No. 7,136,995.

(60) Provisional application No. 60/724,584, filed on Oct. 7, 2005.

(51) Int. Cl.
*G06F 12/14* (2006.01)

(52) U.S. Cl. ............... 713/189; 713/193; 710/5; 710/11; 710/22

(58) Field of Classification Search ............ 710/5, 710/11, 22; 713/189, 193
See application file for complete search history.

(56) References Cited

U.S. PATENT DOCUMENTS

| | | | |
|---|---|---|---|
| 4,352,952 A | 10/1982 | Boone | |
| 5,513,262 A | 4/1996 | van Rumpt et al. | |
| 5,623,546 A | 4/1997 | Hardy | |
| 5,677,952 A | 10/1997 | Blakley, III | |
| 5,748,744 A | 5/1998 | Levy | |
| 5,917,910 A | 6/1999 | Ishiguro | |
| 5,949,882 A | 9/1999 | Angelo | |
| 6,081,895 A | 6/2000 | Harrison et al. | |
| 6,199,163 B1 | 3/2001 | Dumas et al. | |
| 6,272,631 B1 | 8/2001 | Thomlinson | |
| 6,468,160 B2 | 10/2002 | Eliott | |
| 6,473,861 B1 | 10/2002 | Stokes | |
| 6,715,004 B1 | 3/2004 | Grimsrud et al. | |
| 6,735,693 B1 | 5/2004 | Hamlin | |
| 6,772,281 B2 | 8/2004 | Hamlin | |
| 6,954,753 B1 | 10/2005 | Jeran | |
| 2002/0174297 A1 | 11/2002 | McDonald et al. | |
| 2003/0037230 A1 | 2/2003 | Verinksy et al. | |
| 2004/0034768 A1 | 2/2004 | Poldre | |
| 2004/0054914 A1 | 3/2004 | Sullivan | |

OTHER PUBLICATIONS

MacMillan, Dave, Single chip encrypts data at 14 Mb/s, Electronics magazine, Jun. 16, 1981, p. 161-165, vol. 54, No. 12, Paul W. Reiss, USA.

*Primary Examiner*—Matthew B Smithers
*Assistant Examiner*—Paul Callahan
(74) *Attorney, Agent, or Firm*—The Patel Law Firm, P.C.; Natu J. Patel

(57) ABSTRACT

A cryptographic Serial ATA (SATA) apparatus comprises a main controller, a SATA device protocol stack, a SATA host protocol stack, and a cryptographic engine. The cryptographic engine is operatively coupled between the main controller and the SATA device and host protocol stacks and configured to provide high-speed cryptographic processing.

53 Claims, 12 Drawing Sheets

CRYPTOGRAPHIC SERIAL ATA APPARATUS AND METHOD

CROSS-REFERENCE TO RELATED APPLICATIONS

This utility patent application is a continuation-in-part of pending U.S. patent application Ser. No. 10/635,833, filed Aug. 6, 2003, published on Jun. 3, 2004 under US 2004/0107340 Al, now U.S. Pat. No. 7,386,734, which is a continuation-in-part of pending U.S. patent application Ser. No. 09/704,769, filed Nov. 3, 2000, now U.S. Pat. No. 7,136,995, and claims the benefit under 35 U.S.C. 119(e) of U.S. provisional patent application entitled "System and Method of Encrypting and Decrypting Serial ATA Data" by the same inventors, filed Oct. 7, 2005, Ser. No. 60/724,584, the disclosure of each of the aforementioned applications being incorporated herein in its entirety by reference.

COPYRIGHT NOTICE

Portions of the disclosure of this patent document may contain material that is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

FIELD OF THE INVENTION

The present invention relates generally to cryptographic applications and more particularly to a cryptographic Serial ATA (AT Attachment) apparatus and method. The term "ATA" generally refers to the physical, electrical, transport, and command protocols for the internal attachment of storage devices. The term "AT" derives from an IBM® PC (Personal Computer) AT (Advanced Technology) that was introduced in 1984 and was the most advanced PC at that time.

BACKGROUND OF THE INVENTION

The Serial ATA ("SATA") specification is intended as a high-speed replacement for parallel ATA. Three different speed generations are defined by the SATA specification, namely Generation 1 operating at a transfer rate of 1.5 Gigabits per second (Gbps), Generation 2 operating at 3.0 Gbps, and Generation 3 operating at 6.0 Gbps. The SATA specification defines a point-to-point connection between a host adapter and a storage device controller. An example of a host adapter may be an integrated circuit including a Serial ATA controller with a PCI interface. The term "PCI" stands for "Peripheral Component Interconnect," which is a local bus standard developed by the Intel® Corporation. An example of a storage device may be a Serial ATA hard-disk drive. This point-to-point connection is not intended to be shared, i.e. on any given channel, another device generally does not compete for bandwidth.

The SATA controller presents itself to the Operating System ("OS") like a parallel ATA controller. Thus, the SATA controller supports the same commands and the same initialization behavior of a parallel ATA controller. Particularly, Serial ATA presents host software with the same set of task-file programming registers as parallel ATA. However, in Serial ATA these registers are generally not physically located on the disk drive. Instead, the registers have been moved into the host controller with the SATA specification referring to the same as "shadow" registers. By precisely emulating the same register interface to the disk drive, software compatibility is assured.

The SATA specification provides for layering of functions. The lowest layer in the SATA architecture is the Phy ("Physical") layer, which is responsible for generating actual electrical signals, transmitting the generated electrical signals, and deciphering the received electrical signals. Phy layer capabilities also include signaling of special hard reset signal, detection of host plug/unplug, transition from power management states as well as speed negotiation. In this regard, the SATA specification uses low-voltage differential signaling. Particularly, a signal is not conveyed as the voltage on a conductor relative to a common ground, but as the voltage difference between two adjacent conductors. While the voltage on one conductor is "high", the voltage on the other conductor is "low", i.e. each of the two adjacent conductors effectively acts as the inverse of the other. This type of signaling provides noise and crosstalk immunity benefits. Any EMI (Electro-Magnetic Interference), including noise and crosstalk, affecting the adjacent signals by the same amount is subject to differential cancellation at the receiver end.

Above the Phy layer is the Link layer, which is responsible for encoding transmitted data, decoding received data, and basic communications and protocol. A fairly common $8b/10b$-encoding scheme is used. An 8-bit byte has 256 different values, which are tabulated in various ASCII (American Standard Code for Information Interchange) tables. A 10-bit byte has 1024 different values. By encoding the 256 possible byte values using a 10-bit field, it is possible to select which 256 values out of the 1024 possible values are utilized in the encoding scheme. The $8b/10b$-encoding scheme includes limited run length, DC balance, and the ability to encode special control characters known as primitives.

Primitives are used for signaling special conditions between a transmitter and a receiver, such as SOF (Start of Frame), EOF (End of Frame), ALIGN (used to identify the location of the character boundaries in a bit stream). The Link layer includes (a) "idle" protocol, which establishes communications, (b) "transmit" protocol, which handles transmission of data payload, (c) "receive" protocol, which handles reception of transmitted data payload, and (c) "power management" protocol, which handles entry/exit from two power management states.

The Link layer is also responsible for delivering packets of payload data, which are called Frame Information Structures (FISes). A frame is a group of Dwords that convey information between a host and a device. A Dword may be represented as 32 bits of data, as two adjacent words, or as four adjacent bytes. When shown as bits, the least significant bit is bit 0 and the most significant bit is bit 31, which is tabulated on the left.

The Link layer protocol describes the sequences of primitives that are exchanged between a host and a device and the respective responses to various primitives and conditions. The Link layer protocol is responsible for computing a CRC (Cyclic Redundancy Check) for every FIS data payload transferred. The computed CRC is attached at the end of a FIS that is being transmitted. The Link layer verifies and removes the CRC from every received FIS. To minimize EMI impact on data payload transfers, the Link layer scrambles the payload data in a FIS before it is transmitted over the SATA interface.

Above the Link layer in the SATA architecture is the Transport layer, which constructs (encapsulates) FISes for transmission and decomposes (de-encapsulates) received FISes. When requested to construct (encapsulate) a FIS by a higher layer, the Transport layer (a) gathers FIS content based on the type of FIS requested, (b) places FIS content in the proper order, (c) notifies the Link layer of required frame transmission and passes FIS content to the Link layer, (d) manages Buffer/FIFO (First In First Out) flow and notifies Link layer of required flow control, (e) receives frame receipt acknowledgment from the Link layer, and (f) reports good transmission or errors in transmission to the higher layer. The Transport layer maintains no context in terms of ATA commands or previous FIS content.

The generic form of a FIS includes a FIS header and a FIS body. The FIS header generally consists of a FIS type field value and control field(s). The FIS body contains the data payload. The FIS type field value is contained in the first byte. FIS types include: (a) Register-Host to Device, (b) Register-Device to Host, (c) Data, (d) DMA (Direct memory Access) Activate, (e) PIO (Programmed Input/Output) Setup, (f) Set Device Bits, (g) DMA Setup, and (h) BIST (Built-In Self-Test) Activate. The second byte contains control information for the FIS and has three defined bits and several reserved bits. The three defined bits do not apply to all FISes. The three defined bits include the C (upper) bit, which is a command/control bit, the I bit, which is used to indicate if an interrupt should be triggered, and the D bit, which carries directional information. All fields after the first two bytes of the first word are FIS payload data.

For example, Register-Host to Device has a FIS type value of 0x27, a 0xAA value after scrambling, and a 10b-encoded value of 0101011010 in binary form. The format of Data FIS is identical whether transmitted from host to device or from device to host. Data FIS includes two fields for identifying the FIS type and related control information with the rest being payload data that is being conveyed.

In order to perform high speed cryptographic processing on FISes, two main tasks need to be performed. First, data FISes should be promptly detected and separated from non-data FISes; and second, each detected data FIS should be promptly examined to determine if it includes information that should be cryptographically processed. Cryptographic processing may include the following actions: (a) "bypass true," which entails passing frames without subjecting the same to encryption/decryption; and (b) "bypass false," which subjects the frames to encryption/decryption, respectively. A conventional method for performing these operations involves, first, the de-encapsulation of the entire received SATA protocol stack, then, analysis of the de-encapsulated information, and, finally, re-encapsulation of the information into a SATA protocol stack for transmission. This process is inefficient in terms of hardware/software complexity and inherent operation time latency.

A more efficient and less complex means of performing cryptographic processing under the SATA specification is needed. Such cryptographic SATA processing means should be able to encrypt/decrypt selected data streams received at each I/O side (host and device) at high speed. Furthermore, such means should be capable of efficiently distinguishing a received FIS with a data payload that requires cryptographic processing from all others that do not require cryptographic processing.

SUMMARY OF THE INVENTION

Some embodiments disclosed herein are generally directed to a cryptographic Serial ATA apparatus.

In accordance with one aspect of the present invention, the cryptographic Serial ATA apparatus comprises a main controller, at least one protocol stack adapted for differential signaling, and at least one cryptographic engine. The cryptographic engine is operatively coupled between the main controller and the protocol stack and configured to provide high-speed cryptographic processing.

In accordance with another aspect of the present invention, the cryptographic Serial ATA apparatus comprises a main controller, at least one SATA protocol stack, and at least one cryptographic engine. The cryptographic engine is operatively coupled between the main controller and the SATA protocol stack and adapted to provide high-speed cryptographic processing.

In accordance with yet another aspect of the present invention, the cryptographic Serial ATA apparatus comprises a main controller, a SATA device protocol stack, a SATA host protocol stack, and at least one cryptographic engine. The cryptographic engine is operatively coupled between the main controller and the SATA host and device protocol stacks and adapted to provide high-speed cryptographic processing.

Other embodiments disclosed herein are generally directed to a cryptographic Serial ATA method.

In accordance with one aspect of the present invention, the cryptographic Serial ATA method comprises the steps of providing a cryptographic Serial ATA (SATA) apparatus between a host and a device; utilizing the cryptographic SATA apparatus to detect a PIO (Programmed Input/Output) data-out command FIS received from the host, and determine whether the received PIO data-out command FIS belongs to a pre-defined category (the pre-defined category corresponding to the cryptographic SATA apparatus being set in encryption mode); using the cryptographic SATA apparatus to bypass all PIO setup FISes received from the device to the host; utilizing the cryptographic SATA apparatus to detect data FIS payload being received from the host (with the detected data FIS payload being encrypted); and utilizing the cryptographic SATA apparatus to detect status register FIS being received from the device. The detected status register FIS causes the cryptographic SATA apparatus to re-set to bypass mode.

In accordance with another aspect of the present invention, the cryptographic Serial ATA method comprises the steps of providing a cryptographic Serial ATA (SATA) apparatus between a host and a device; utilizing the cryptographic SATA apparatus to detect a DMA (Direct Memory Access) data-in command FIS received from the host, and determine whether the received DMA data-in command FIS belongs to a pre-defined category (the pre-defined category corresponding to the cryptographic SATA apparatus being set in decryption mode); utilizing the cryptographic SATA apparatus to detect data FIS payload being received from the device (wherein the detected data FIS payload is being decrypted); and using the cryptographic SATA apparatus to detect status register FIS being received from the device. The detected status register FIS causes said cryptographic SATA apparatus to re-set to bypass mode.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings in which.

DETAILED DESCRIPTION OF THE INVENTION

Some embodiments of the present invention are described in detail with reference to the appended drawings of FIGS. 1-12. Additional embodiments, aspects, features and/or advantages of the invention will become apparent from the ensuing description or may be learned by practicing the invention. In the figures, the drawings are not to scale with like numerals referring to like features throughout both the drawings and the description.

Figure 1:
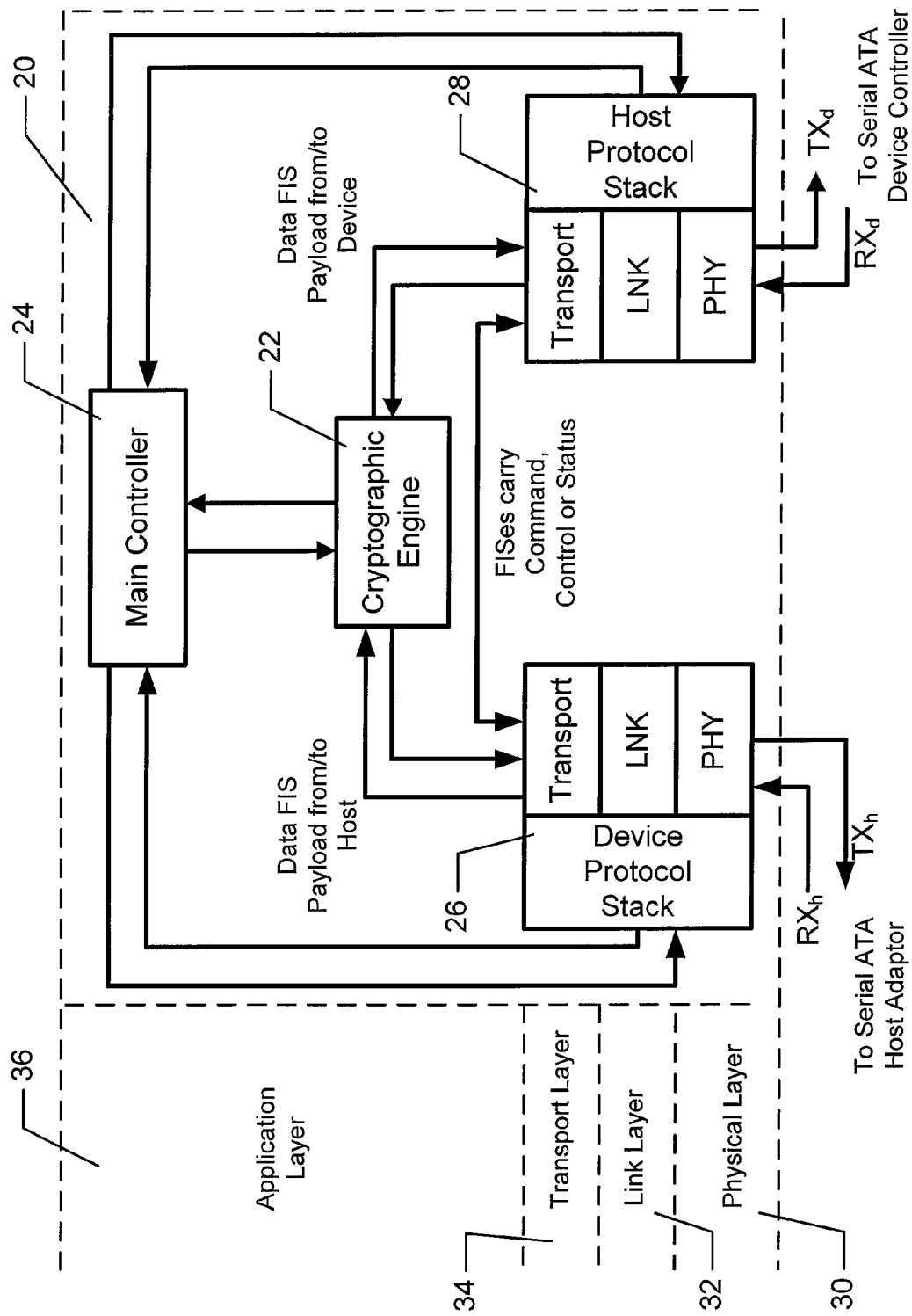
FIG. 1 is a block diagram of a cryptographic Serial ATA ("SATA") apparatus in accordance with the present invention.

FIG. 1 is a block diagram of a cryptographic Serial ATA ("SATA") apparatus 20 in accordance with the present invention. On one side, cryptographic SATA apparatus 20 is configured to receive input $RX_h$ from and transmit output $TX_h$ to a SATA host adapter (not shown), respectively. The SATA host adapter (hereinafter referred to as "host") may be provided, for example, on a host PC (Personal Computer). On another side, cryptographic SATA apparatus 20 is configured to receive input $RX_d$ from and transmit output $TX_d$ to a SATA device controller (not shown), respectively. The SATA device controller (hereinafter referred to as "device") may be provided, for example, on a peripheral device such as a hard disk drive, optical drive (e.g., CD ROM, DVD ROM, etc.) and the like. Cryptographic SATA Apparatus 20 communicates with the host and the device through an appropriate communicative coupling, such as Serial ATA cables, although this disclosure is not limited only to Serial ATA cables. Information, including command, control, status, and data signals that the host sends to or receives from the device, is encapsulated into a Serial ATA protocol stack and serialized such that it can be carried in two differential signals, typically over a cable connection.

In one embodiment of the present invention, cryptographic SATA Apparatus 20 comprises a cryptographic engine 22 operatively coupled between a main controller 24 and device and host protocol stacks 26 and 28, respectively. Each protocol stack (26, 28) includes a Physical (PHY) layer 30, a Link (LNK) layer 32, and a Transport layer 34. An Application layer 36 includes cryptographic engine 22 and main controller 24, as generally shown in FIG. 1.

Cryptographic engine 22 performs encryption/decryption operations on predefined and/or selected data FIS payload exchanged between the host and the device. Non-data FISes or data FISes that do not require encryption/decryption, such as FISes carrying command, control or status information, are allowed to pass (from one side to another) straight through, i.e. bypassing cryptographic engine 22, as generally depicted in FIG. 1. A person skilled in the art would readily appreciate that there are a number of known cryptographic engines, any of which could conceivably be adapted for use in the cryptographic SATA apparatus of the present invention.

Main controller 24 regulates all signal paths that carry data, command, control, and status signals. Main controller 24 receives signals from all lower layers (Transport layer 34, Link layer 32, and Physical layer 30). The received signals may include FIS types and commands detected, transfer directions (host-to-device or device-to-host), control signals such as primitive detection indicators from Link layer 32, Out of Band (OOB) detection indicators from Physical layer 30, and other channel status indicators, as well as abnormal conditions such as transmission error or abort. Main controller 24 also regulates the operation of cryptographic engine 22, as generally illustrated in reference to FIG. 1. Main controller 24 helps cryptographic SATA apparatus 20 recover from abnormal operating conditions and maintains a stable connection between the host and the device.

Figure 2:
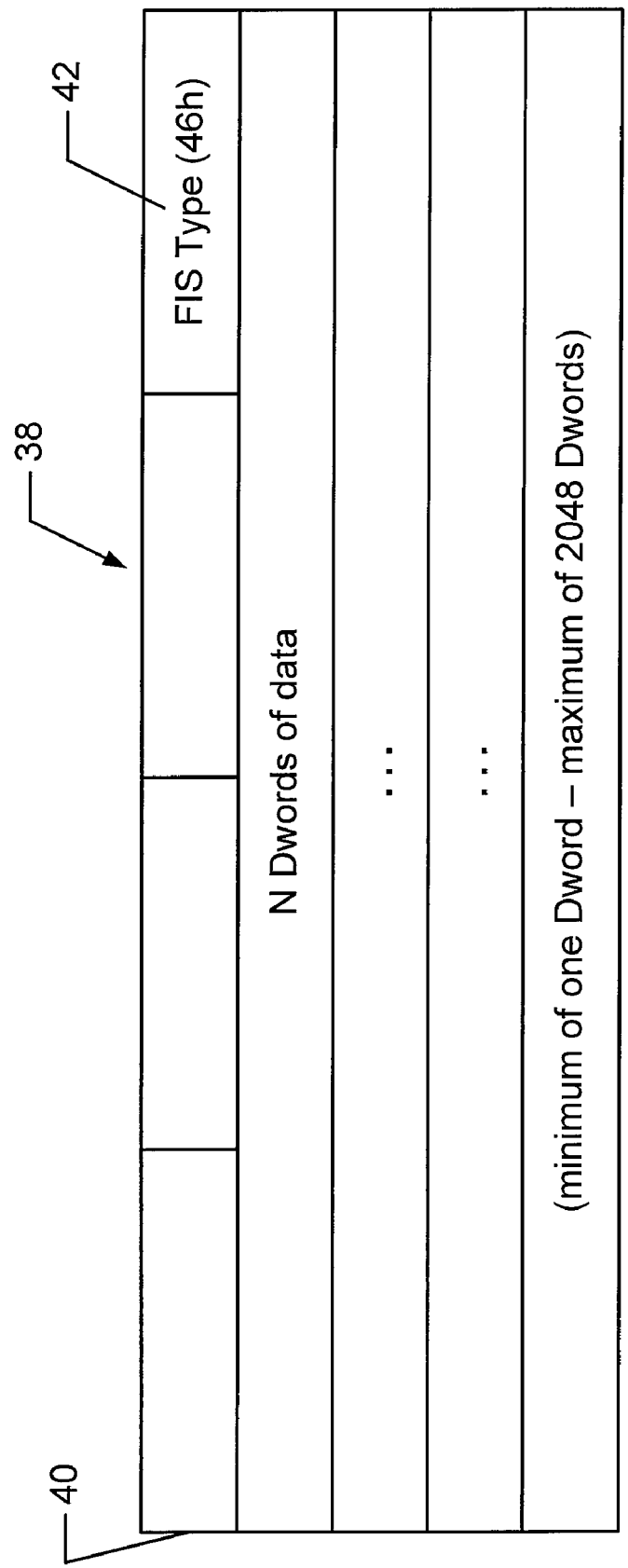
FIG. 2 is a tabular representation of the bit layout of a data FIS ("Frame Information Structure") in SATA Transport Layer.

FIG. 2 is a tabular representation of the bit layout of a data FIS 38 in SATA Transport Layer 34. Data FIS 38 is comprised of a plurality of Dwords. The first Dword of the data FIS is data FIS header 40. The first byte 42 in data FIS header 40 is the data FIS type field. The remaining three bytes of the first Dword contain reserved bits, reserved bit-fields, and reserved bytes (not shown). The remaining N Dwords in data FIS 38 are data payload. The payload of certain data FISes are encrypted/decrypted by cryptographic engine 22 (FIG. 1). Non-data FISes, however, are not processed by cryptographic engine 22. To re-transmit the cryptographically processed data output from cryptographic engine 22, such output data is re-encapsulated into a data FIS by adding a data FIS header.

One quick way to determine whether a received FIS is data FIS or non-data FIS is to configure cryptographic SATA apparatus 20 to examine the FIS type field, i.e. the first byte of the received FIS header. Particularly, a FIS type detector may be provided in Transport layer 34 or in Link layer 32, as described herein below in reference to FIGS. 7-8. A person skilled in the art would appreciate, however, that the remaining bytes of the first Dword of the received data FIS could also be analyzed according to the general principles of the present invention. If the value of the FIS type field has hexadecimal value 0x46, then the received FIS is a data FIS. Otherwise, it is a non-data FIS. In this regard, FIG. 2 shows FIS type (46h) in first byte 42 of data FIS header 40.

Figure 3:
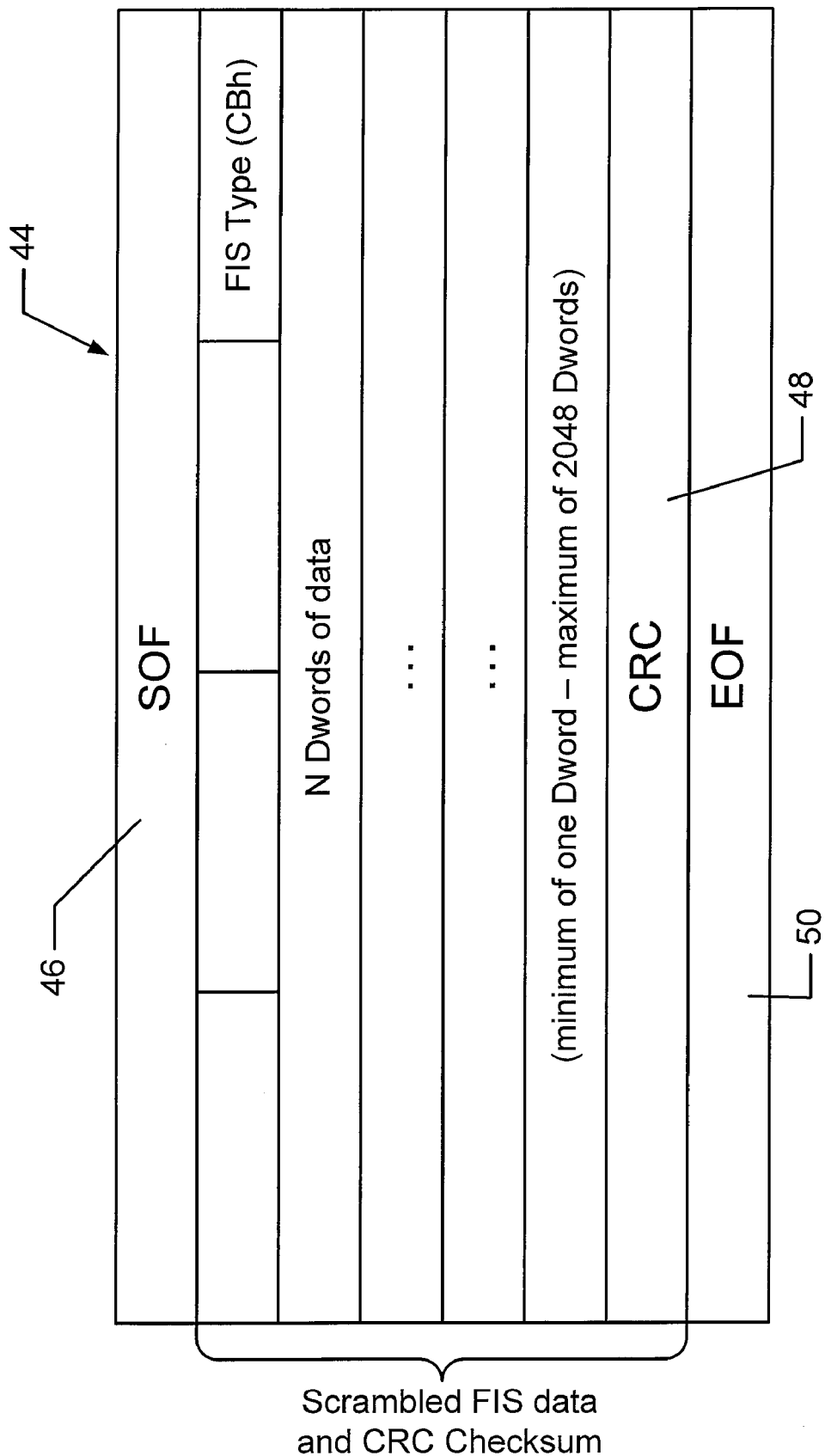
FIG. 3 is a tabular representation of the bit layout of a data FIS in SATA Link Layer.

FIG. 3 is a tabular representation of the bit layout of a data FIS 44 in SATA Link layer 32. The bit layout includes SOF primitive 46, which is a 32-bit unique codeword, to indicate the start of a frame. SOF primitive 46 is followed by a scrambled version of the Transport layer data FIS, and a 32-bit CRC checksum 48 which is also scrambled. CRC checksum 48 is followed by EOF primitive 50, which is a 32-bit primitive to mark the end of the frame.

In one embodiment, the scrambling operation performs bit-wise XOR (Exclusive OR) operation on FIS Dwords with a prescribed scrambler syndrome sequence. XOR is a Boolean operator that returns a value of TRUE only if just one of its operands is TRUE. The scrambler syndrome generator is reset on the SOF primitive and the FIS type field value immediately follows the SOF primitive. The scrambler syndrome at the time the FIS type field value is transmitted is equal to the seed used for the scrambling generator. The primary purpose of FIS scrambling is to reduce electromagnetic interference (EMI). It should be understood that any suitable method to scramble or otherwise transform data FIS 44 could be used, provided such use does not depart from the intended purpose of the present invention.

Figure 4:
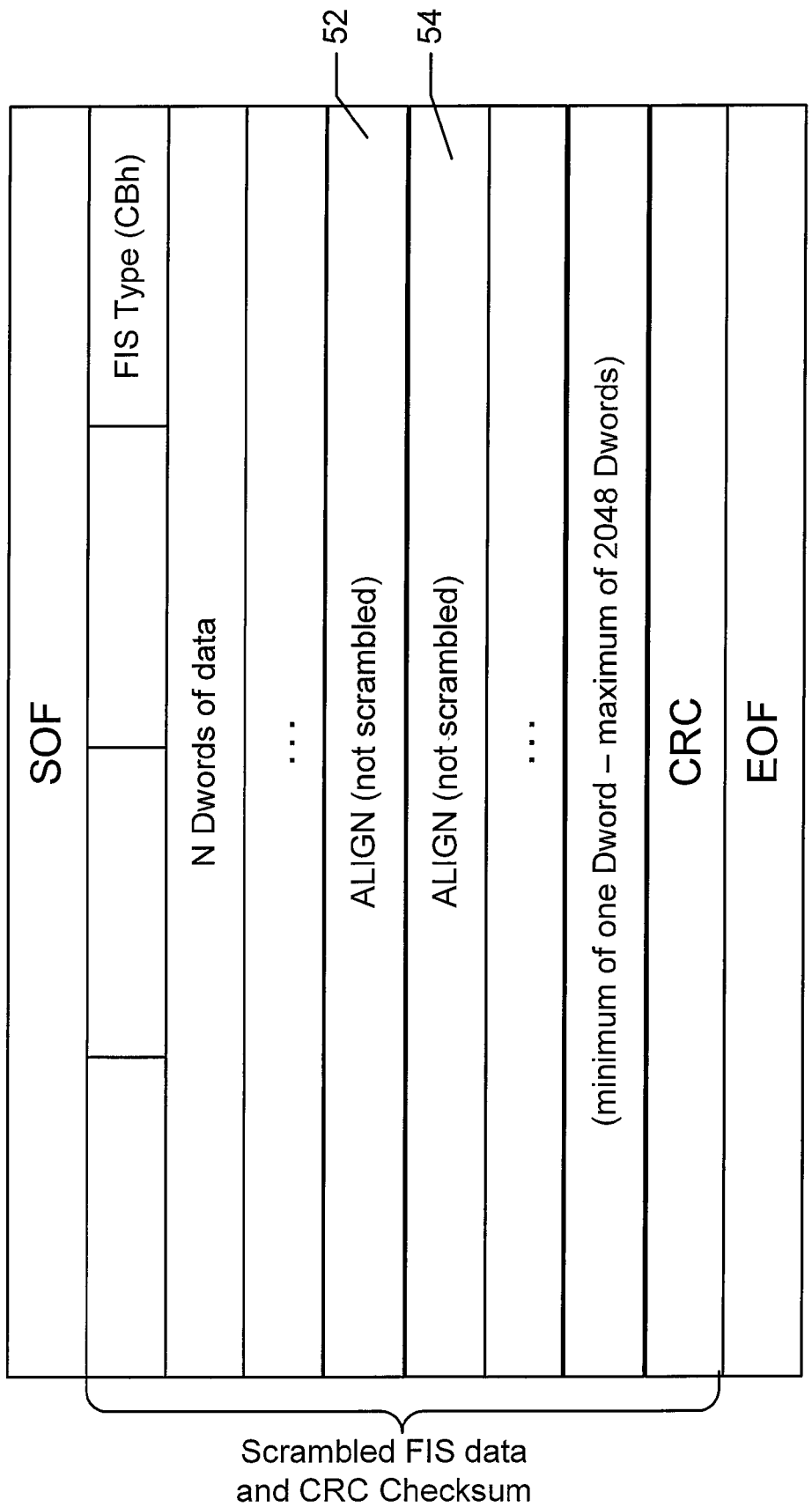
FIG. 4 shows the bit layout of FIG. 3 with inserted ALIGN primitives.

FIG. 4 shows the bit layout of FIG. 3 with inserted ALIGN primitives 52, 54. ALIGN primitives 52, 54 are inserted by the transmitter, and are not scrambled. ALIGN primitives 52, 54 are inserted at a prescribed location within the bit layout of data FIS 44 of FIG. 3. ALIGN primitives 52, 54 provide signal alignment flow control. In one embodiment, there may be consecutive even number of ALIGN primitives for every 256 Dwords transmitted. ALIGN primitives 52, 54 are not part of the Transport layer protocol and are dropped from the context when received. For purposes of describing the general principles of the present invention, it is generally assumed from hereon that all ALIGN primitives have already been dropped.

As mentioned hereinabove, a FIS type detector may be provided in Link layer 32 (FIG. 8) to determine whether a FIS encapsulated in Link layer protocol format is a data FIS. One way is by detecting the 8-bit scrambled FIS type value whereby a hexadecimal value of 0xCB indicates a data FIS. Another way is by checking the data scrambler syndrome whereby a hexadecimal value of 0x8D indicates a data FIS. Yet another way is by detecting the 10-bit encoding character (where a value of 1101000110 in binary format indicates a data FIS) right after the SOF primitive.

Not all detected data FISes have to be cryptographically processed. A data FIS with ATA commands that are associated with device setup, configuration, and status inquiries bypasses cryptographic engine 22 (FIG. 1). For instance, a data FIS that associates with the IDENTIFY_DEVICE command under Programmed Input/Output (PIO) does not require encryption/decryption by cryptographic engine 22 as the command/data relate to device configuration, setup, and status inquiry. Various relevant PIO command/data ("bypass true" category) are listed herein below, as follows:

CFA_TRANSLATE SECTOR
DEVICE_CONFIGURATION_IDENTIFY
IDENTIFY_DEVICE
IDENTIFY_PACKET DEVICE
READ_LOG_EXT
SMART_READ_DATA
SMART_READ_LOG_SECTOR
CFA_WRITE_MULTIPLE_WITHOUT_ERASE
CFA_WRITE_SECTORS_WITHOUT_ERASE
DEVICE_CONFIGURATION_SET
DOWNLOAD_MICROCODE
SECURITY_DISABLE_PASSWORD
SECURITY_ERASE_UNIT
SECURITY_SET_PASSWORD
SECURITY_UNLOCK
SMART_WRITE_LOG_SECTOR
WRITE_LOG_EXT

A person of skill in the art would appreciate that various new PIO commands may be added in a future version of the SATA specification and used thereafter in accordance with the general principles of the present invention.

Figure 5:
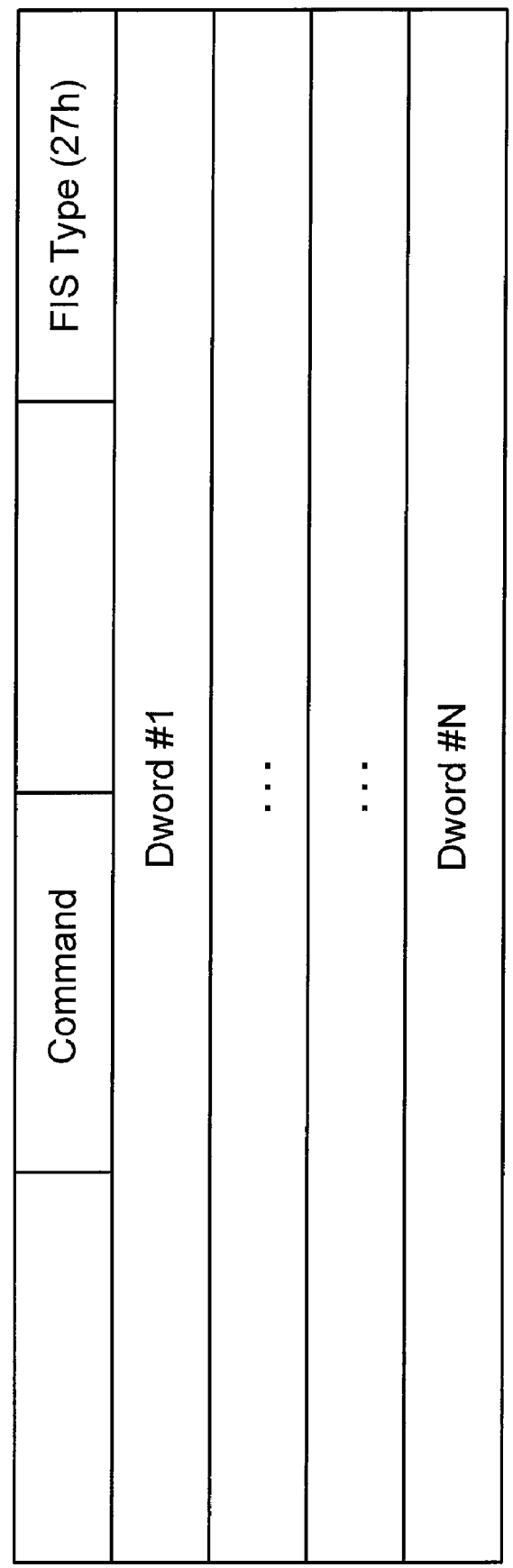
FIG. 5 is a tabular representation of the bit layout of a Register-Host to Device FIS in SATA Transport Layer.

An ATA data transfer command usually associates with one or more data FISes until the end of its protocol sequence. All ATA commands may be detected by examining the command field (the third byte) of a Register-Host to Device FIS 56 in SATA Transport layer 34, as schematically shown in FIG. 5. The FIS type hexadecimal value of Register-Host to Device FIS 56 in FIG. 5 is 0x27 (de-scrambled). Thus, the decision whether to bypass or not bypass cryptographic engine 22 is command-based. That is, if a detected command belongs to the "bypass true" category, as defined hereinabove, then all data FISes in that command protocol will bypass cryptographic engine 22 (FIG. 1). Alternatively, if a detected command belongs to a "bypass false" category, as defined herein below, all data FISes in that command protocol will be cryptographically processed. An example of various PIO and UDMA (Ultra DMA) "bypass false" category commands follows:

READ_SECTOR
READ_SECTOR_EXT
READ_MULTIPLE
READ_MULTIPLE_EXT
READ_BUFFER
READ_DMA
READ_DMA_EXT
WRITE_SECTOR
WRITE_SECTOR_EXT
WRITE_MULTIPLE
WRITE_MULTIPLE_EXT
WRITE_BUFFER
WRITE_DMA
WRITE_DMA_EXT

Thus, for example, if a SATA command protocol relates to reading/writing-data from/to physical storage media (such as optical tracks of a CDRW or sectors of a hard disk drive), the payloads of all data FISes in that particular command protocol will be cryptographically processed.

A person of skill in the art would appreciate that various new PIO Read/Write and DMA Read/Write commands may be added in a future version of the SATA specification, and used thereafter in accordance with the general principles of the present invention. For example, the current SATA specification only provides PIO Opcodes, but no command description for F7, FB, 5C, 5E, which do not utilize extended registers and the transfer length is governed by the sector count register (value 0-255 with 0 meaning 256 sectors). They conform to the ATA PIO timing and control flow signals but like SECURITY_ERASE_UNIT (see above) may take a long time to execute. All currently undescribed UDMA Opcodes include 5D-UDMA Read, 5F-UDMA Write. Their command characteristics are presently unknown.

In one embodiment of the present invention, all data FISes in a command protocol in which the detected commands are not listed in either the "bypass false" category or the "bypass true" category will bypass cryptographic engine 22. For instance, cryptographic SATA apparatus 20 may not be configured to support DMA command QUEUE (another data read/write command that carries data requiring cryptographic processing), and thus the command and data are passed through clear, i.e. bypass cryptographic engine 22.

Figure 6:
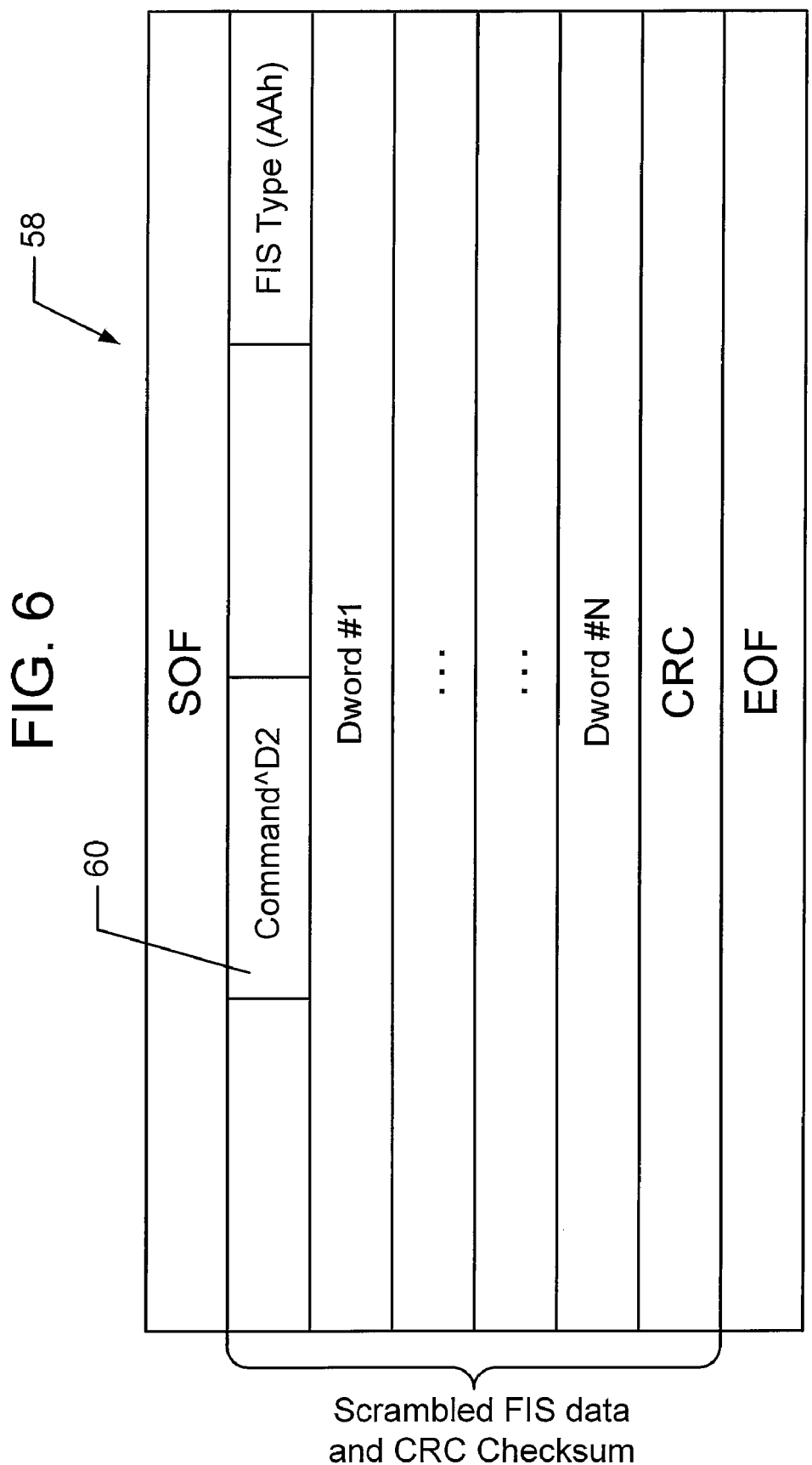
FIG. 6 is a tabular representation of the bit layout of a Register-Host to Device FIS in SATA Link Layer.

FIG. 6 is a tabular representation of the bit layout of a Register-Host to Device FIS 58 in SATA Link Layer 32. FIGS. 5-6 illustrate the bit layout of a "Register—Host to Device" FIS in Transport and Link layers, respectively. As shown in FIG. 6, the FIS type has 8b scrambled hexadecimal value 0xAA. The data scrambler syndrome of command field 60 in FIG. 6 has a prefixed hexadecimal value of 0xD2. Thus, the command field in Link layer 32 has a value equal to the XOR result of the 0xD2 and command code before the de-scrambling operation is performed.

Figure 7:
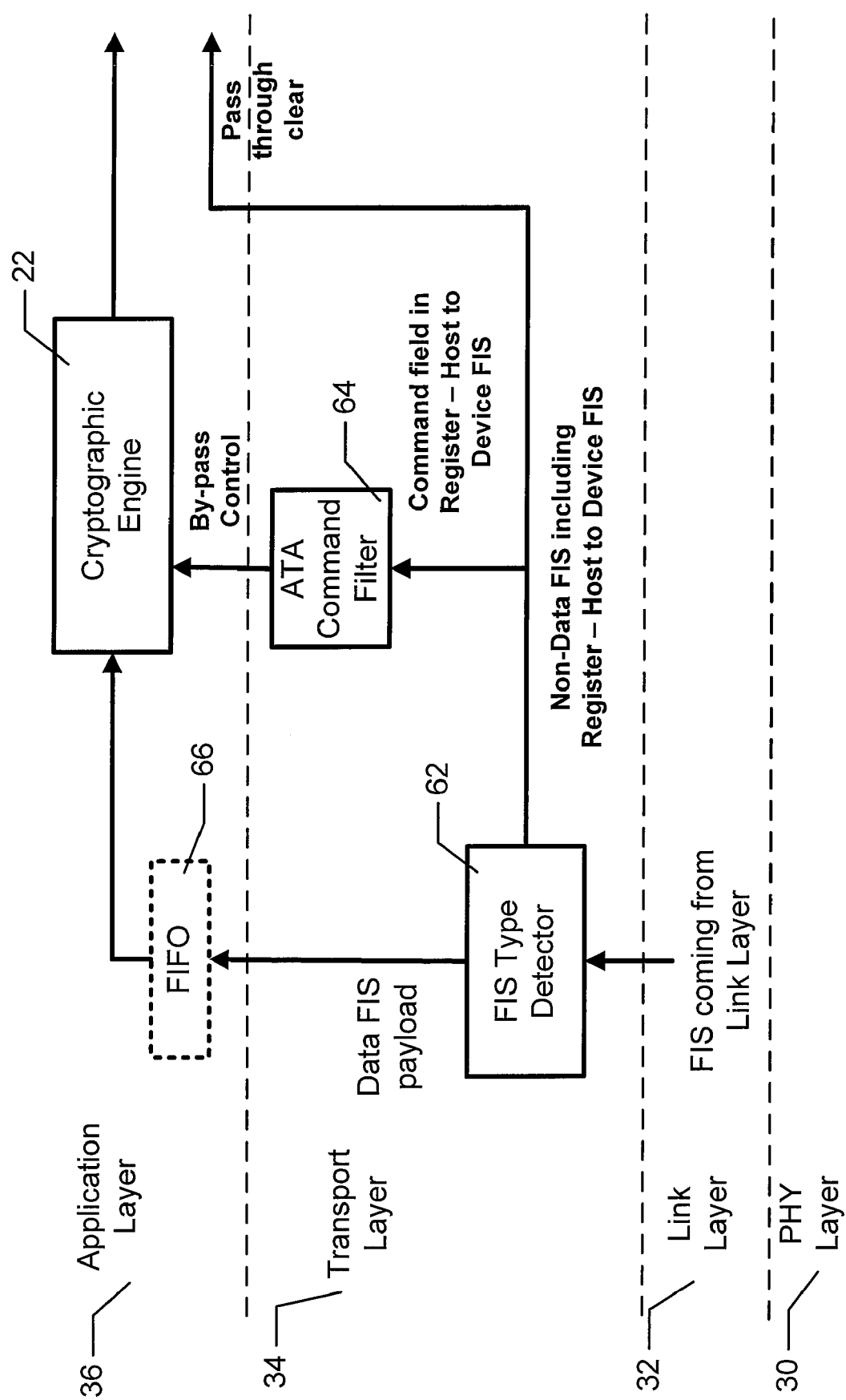
FIG. 7 is a partial schematic representation of one embodiment of the cryptographic SATA apparatus of FIG. 1 in accordance with the present invention.

FIG. 7 is a partial (one side only) schematic representation of one embodiment of cryptographic SATA apparatus 20 (FIG. 1) in accordance with the present invention. A person of skill in the art would recognize that other alternative configurations (such as a parallel ATA interface and/or a USB interface) may be provided on the other side of cryptographic SATA apparatus 20.

A FIS type detector 62 is provided in Transport layer 34, as generally shown in FIG. 7. FIS type detector 62 is configured to detect and examine the FIS type field (the first byte) of the FIS header of a FIS coming from Link layer 32. If the FIS type field has hexadecimal value 0x46, then the received FIS is a data FIS. Otherwise, it is a non-data FIS. If the received FIS is a data FIS, FIS type detector 62 will forward the data FIS payload to cryptographic engine 22 for encryption/decryption. If the FIS type field hexadecimal value 0x46 is not found, FIS type detector 62 will steer the non-data FIS from Transport layer 34 through Application layer 36 away from cryptographic engine 22, i.e. without cryptographic processing.

An ATA command filter 64 is also provided in Transport layer 34 and adapted to examine the command field (the third byte of the first 32-bit Dword—see FIG. 5) of any Register-Host to Device FIS (FIS type hexadecimal value is 0x27) coming from Link layer 32. ATA command filter 64 provides bypass control for cryptographic engine 22. It sets a "bypass" flag to "false" if the detected third byte of the Register—Host to Device FIS does not belong to device configuration, setup, and status inquiries, defined hereinabove under the "bypass true" command category. Otherwise, ATA command filter 64 sets the "bypass" flag to "true." The entire Register-Host to Device FIS stream, however, passes through Application layer 36 clear, i.e. without being processed by cryptographic engine 22. Cryptographic engine 22 remains in the previous state until the next "bypass" flag control signal from ATA command filter 64 alters the same. A FIFO buffer 66 (FIG. 7) may be operatively coupled between FIS type detector 62 and cryptographic engine 22, if needed for proper data buffering.

Figure 8:
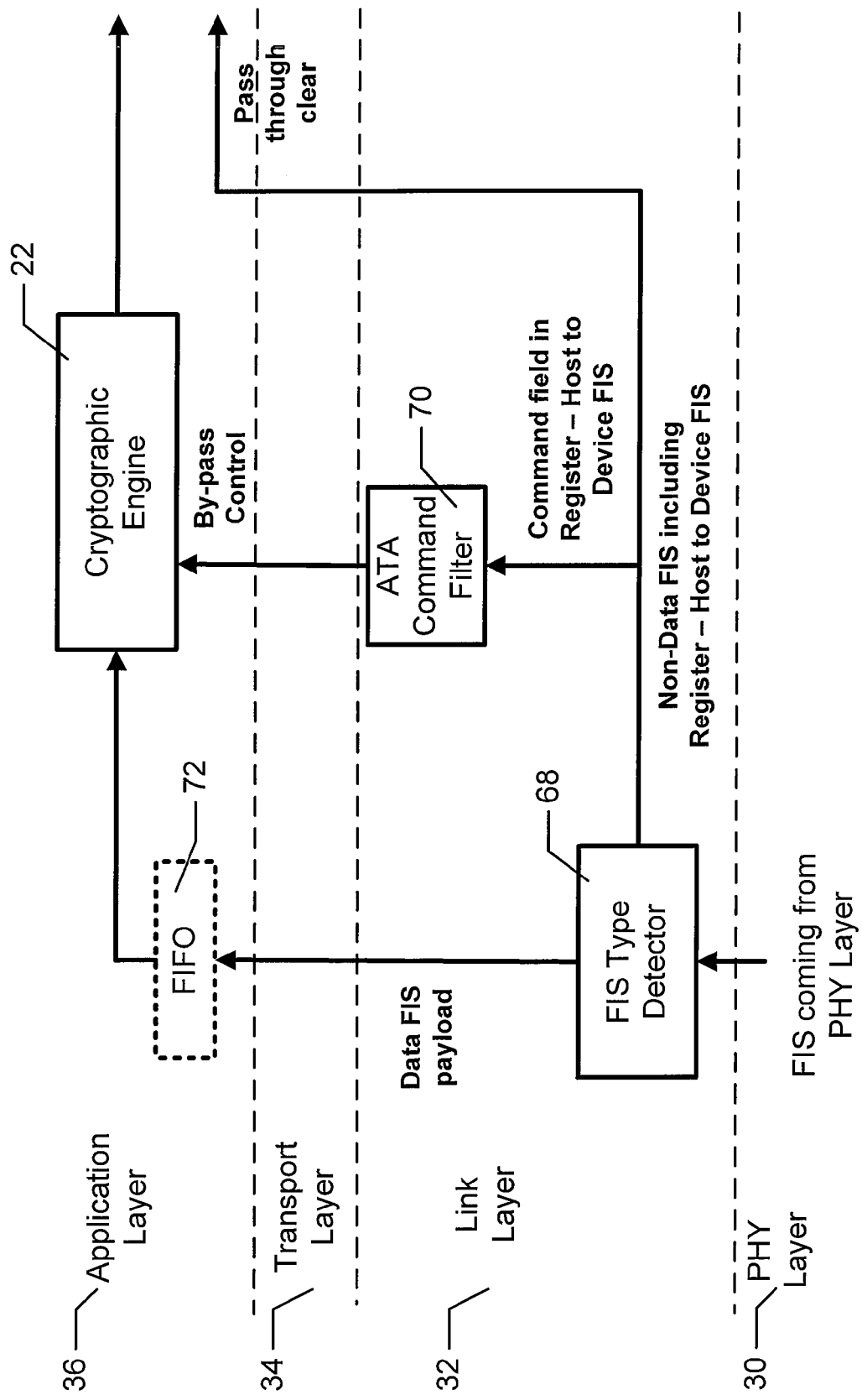
FIG. 8 is a partial schematic representation of another embodiment of the cryptographic SATA apparatus of FIG. 1 in accordance with the present invention.

FIG. 8 is a partial (one side only) schematic representation of another embodiment of cryptographic SATA apparatus 20 (FIG. 1) in accordance with the present invention. A person skilled in the art would recognize that other alternative configurations (such as a parallel ATA interface and/or a USB interface) may be provided on the other side of cryptographic SATA apparatus 20, as needed.

A FIS type detector 68 is provided in Link layer 32, as generally shown in FIG. 8. FIS type detector 68 is configured to determine whether or not an incoming bit stream from Physical layer 30 includes an encapsulated data FIS using one of four methods. The first method involves the determination of a prescribed descrambled byte value, such as the first descrambled byte value after a SOF primitive. The first descrambled byte value after a SOF primitive should have hexadecimal value 0x46 for a data FIS. The second method involves checking a prescribed scrambled byte value, such as the first scrambled byte value after a SOF primitive. The first scrambled byte value following a SOF primitive should have hexadecimal value 0xCB for a data FIS. The third method deals with determination of the byte value with associated scrambler syndrome hexadecimal value of 0x8D. It should have 8b scrambled hexadecimal value of 0xCB for a data FIS. The fourth method determines the content of the first 10-bit character following a SOF primitive. It should have the value (1101000110) in binary format.

If a data FIS is detected, FIS type detector 68 will forward the data FIS payload to cryptographic engine 22 for encryption/decryption. Otherwise, FIS type detector 68 will steer the non-data FIS from Physical layer 30 through Link layer 34 and Application layer 36 away from cryptographic engine 22, i.e. without cryptographic processing.

An ATA command filter 70 is also provided in Link layer 32 and adapted to determine whether or not an incoming bit stream from Physical layer 30 contains a Register-Host to Device FIS that carries ATA commands belonging to the "bypass true" category, as defined hereinabove. Register-Host to Device FIS can be detected in Link layer 32 using one of four methods. The first method determines the value of a prescribed descrambled byte, such as the first descrambled byte value after a SOF primitive. The first descrambled byte value following a SOF primitive should have hexadecimal value 0x27 for a Register-Host to Device FIS. The second method determines the value of a prescribed scrambled byte, such as the first scrambled byte value after a SOF primitive. The first scrambled byte value following a SOF primitive should have hexadecimal value 0xAA for A Register-Host to Device FIS. The third method determines the byte value with associated scrambler syndrome hexadecimal value 0x8D. It should have 8b scrambled hexadecimal value 0xAA for a Register-Host to Device FIS. The fourth method determines the content of the first 10-bit character following a SOF primitive. It should have the value (0101011010) in binary format. A FIFO buffer 72 (FIG. 8) may be operatively coupled between FIS type detector 68 and cryptographic engine 22, if needed for proper data buffering.

A person skilled in the art would undoubtedly recognize that in both embodiments (FIG. 7 and FIG. 8), it is not necessary to de-encapsulate the entire set of Transport layer and/or Link layer protocol in the cryptographic SATA apparatus of the present invention in order to perform cryptographic processing on the data. Thus, the latency time and complexity of software/hardware involved in implementing the embodiments illustrated in FIGS. 7-8 are dramatically reduced.

Figure 9:
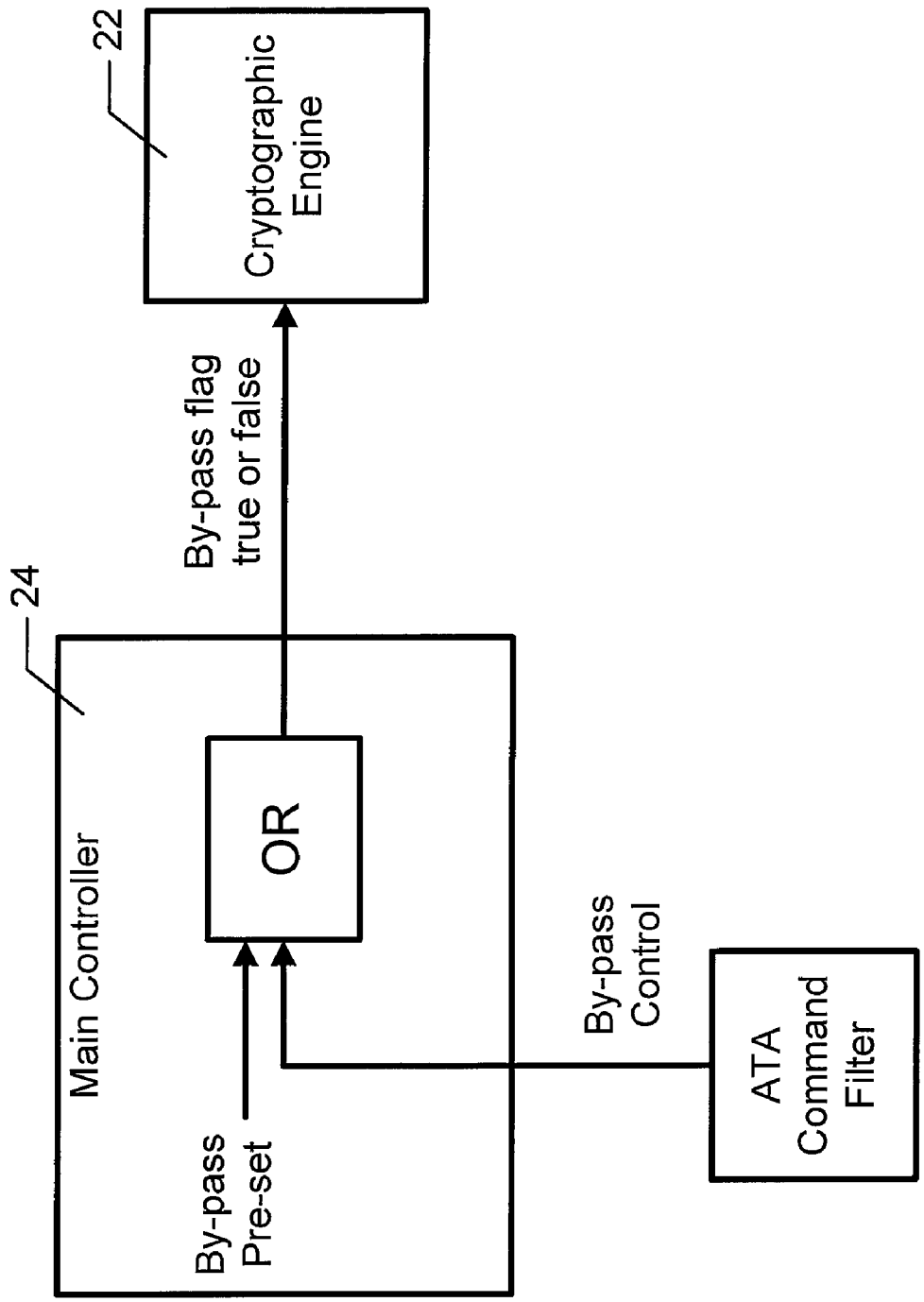
FIG. 9 is a block diagram illustrating cryptographic operational control being performed in accordance with the present invention.

FIG. 9 is a block diagram illustrating cryptographic operational control being performed in accordance with the present invention. It should also be understood that in either embodiment (FIG. 7 or FIG. 8), the "bypass" control signal of ATA command filter (64 or 70, respectively) is logically ORed with a "bypass preset" signal in main controller 24 whose output controls the operation of cryptographic engine 22. The "bypass preset" signal in main controller 24 may be held constant through the entire power cycle of cryptographic SATA apparatus 20. If it is set to logical "one," then the "bypass" flag will be set to "true" regardless of the state of the ATA command filter. If it set to logical "zero," then the operation of cryptographic engine 22 will only depend on the "bypass" control signal provided by the ATA command filter.

There are various advantages to providing the FIS type detector and the ATA Command Filter on the Link layer, as shown in FIG. 8. For example, if the detection is performed in the Link layer, latency time for the FIS type Dword to be pipelined up to the Transport layer is reduced. The time from detection to reaction will thus be less critical. The extra time gained may be useful in situations where time-consuming flow control is performed by an embedded CPU (Central Processing Unit). On the other hand, the embodiment of FIG. 7 has the advantage of being more straightforward, i.e. requires less complex control logic design.

Figure 10:
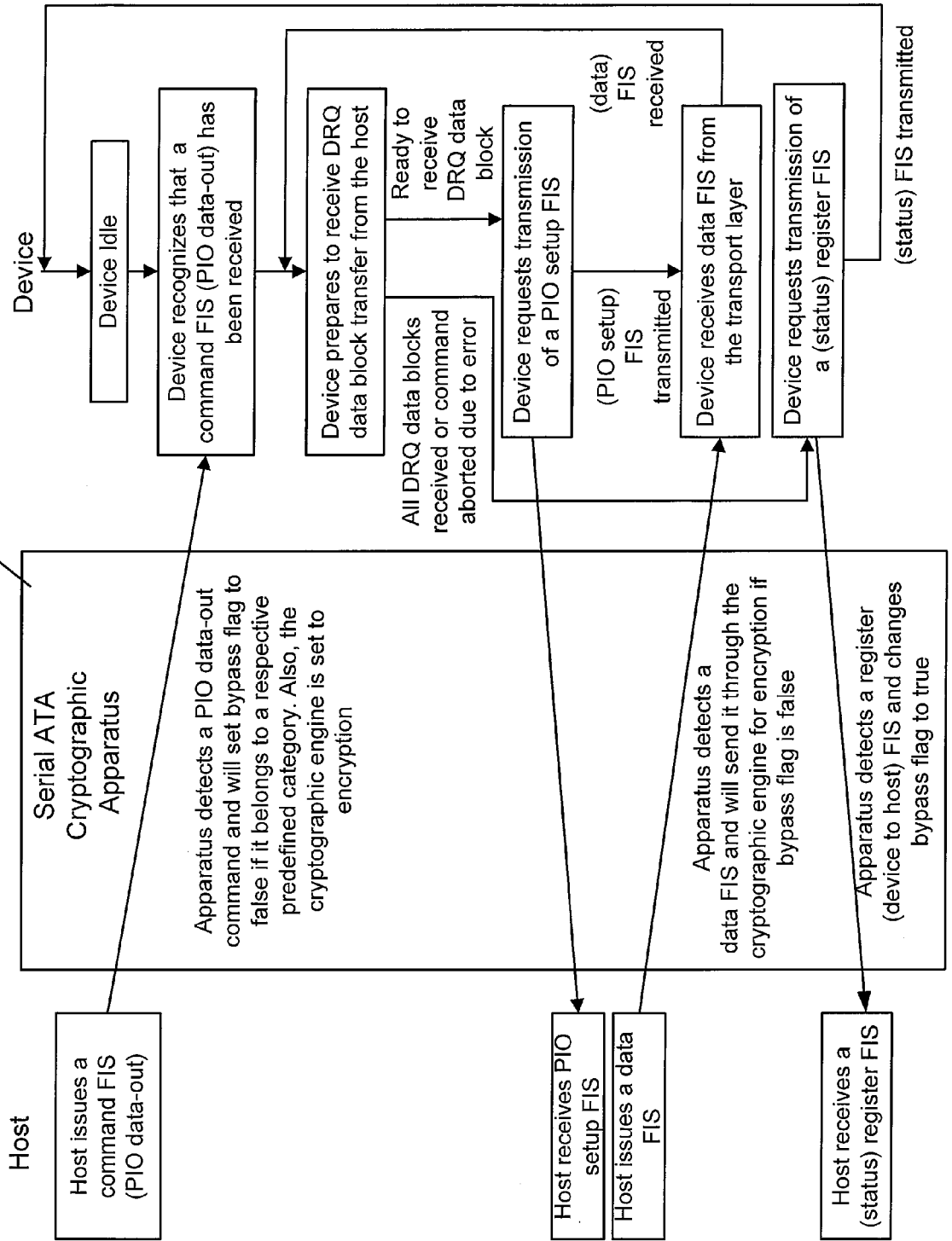
FIG. 10 is a schematic representation of data flow through the cryptographic SATA apparatus of FIG. 1 in accordance with one embodiment of the present invention.

FIG. 10 is a schematic representation of data flow through cryptographic SATA apparatus 20 (FIG. 1) in accordance with one embodiment of the present invention. Specifically, data flow based on a PIO data-out command will be described. Serial ATA cryptographic apparatus 20 operates by reacting and responding based on what is received and detected on the host and device Serial ATA channels. In this embodiment, it is assumed that serial ATA cryptographic apparatus 20 is initially in an "IDLE" state in which it is listening to any activity on both Serial ATA channels. The "bypass" flag is "true" at this state. In Step 1, serial ATA cryptographic apparatus 20 detects that a PIO data-out command FIS has been received from the host. Next, it determines whether the received PIO data-out command belongs to a predefined category. If the PIO data-out command belongs to the predefined category, main controller 24 of serial ATA cryptographic apparatus 20 will re-set the "bypass" flag (FIG. 9) to "false", i.e. cryptographic engine 22 is in encryption mode.

In Step 2, serial ATA cryptographic apparatus 20 will bypass all PIO setup FISes received from the device to the host. In Step 3, when serial ATA cryptographic apparatus 20 detects that a data FIS has been received from the host, all data Dwords in the data FIS will be directed to cryptographic engine 22 for encryption. In Step 4, if serial ATA cryptographic apparatus 20 detects that a (status) register FIS has been received from the device (command completed or aborted), then the "bypass" flag (FIG. 9) will be re-set to "true" and serial ATA cryptographic apparatus 20 returns to "IDLE." Otherwise, if it is determined that the command is not completed, the process repeats Step 2, Step 3, and Step 4, respectively.

Figure 11:
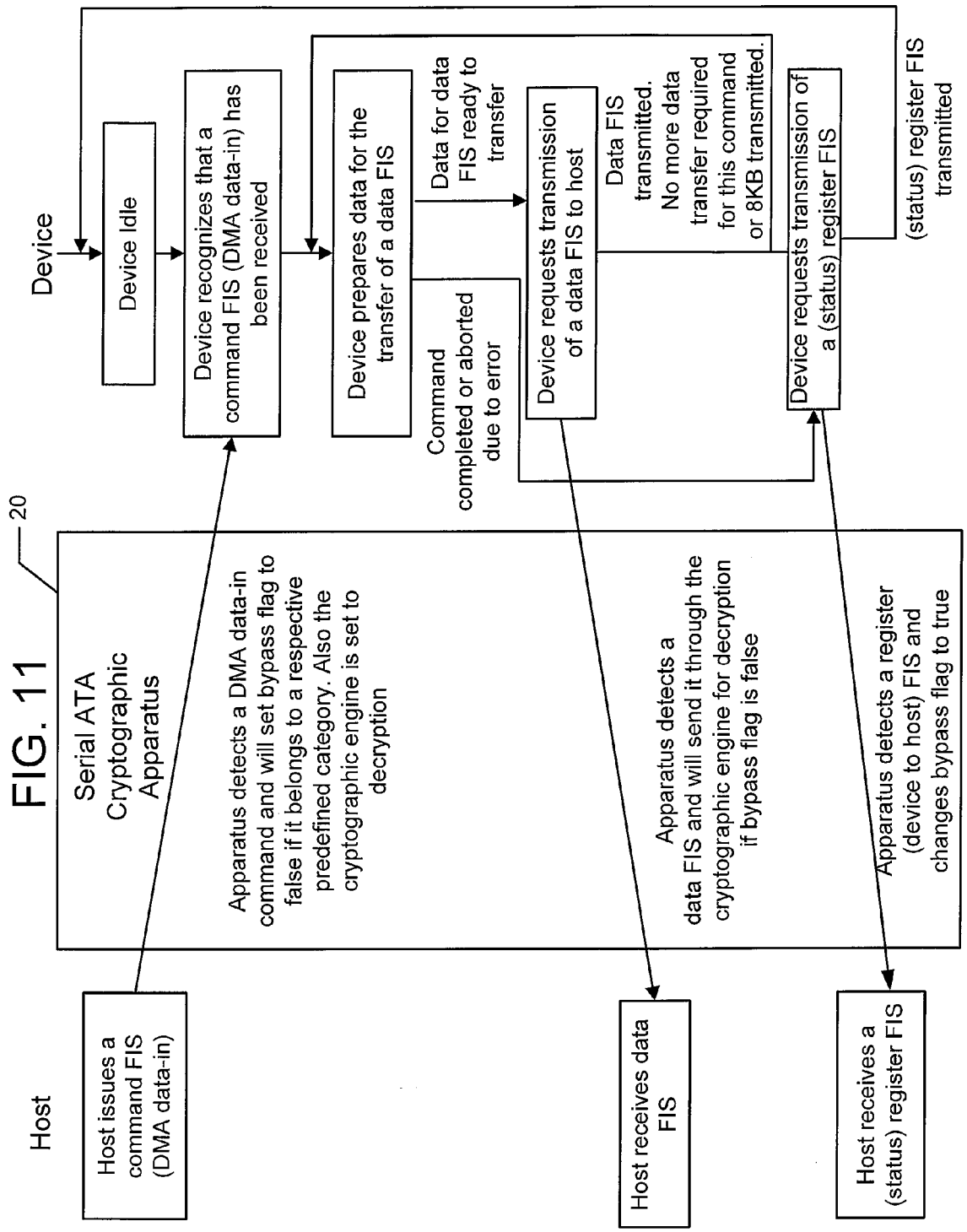
FIG. 11 is a schematic representation of data flow through the cryptographic SATA apparatus of FIG. 1 in accordance with another embodiment of the present invention.

FIG. 11 is a schematic representation of data flow through cryptographic SATA apparatus 20 (FIG. 1) in accordance with another embodiment of the present invention. Specifically, data flow based on a DMA data-in command will be described. It is assumed that cryptographic SATA apparatus 20 initially is in an "IDLE" state in which it is listening to any activity on both Serial ATA channels. The "bypass" flag is "true" in this state.

When a Serial ATA drive is about to transfer data to the host, the drive sends an appropriate request signal to the host. Upon receipt of an acknowledgment from the host, the drive transmits a data FIS. Upon receiving the transmitted data FIS, the DMA engine in the host controller transfers the received data to successive memory locations in a pre-programmed destination memory region on the host.

In Step 1, if cryptographic SATA apparatus 20 detects that a DMA data-in command FIS has been received from the host, and if such command belongs to a predefined category, then main controller 24 of serial ATA cryptographic apparatus 20 will set the "bypass" flag (FIG. 9) to "false," serial ATA cryptographic apparatus 20 is in decryption mode. In Step 2, upon serial ATA cryptographic apparatus 20 detecting that a data FIS has been received from the device, all data Dwords in the data FIS will be directed to cryptographic engine 22 for decryption. In Step 3, if serial ATA cryptographic apparatus 20 detects that a (status) register FIS has been received from the device (command completed or aborted), then the "bypass" flag is re-set by main controller 24 to "true," and serial ATA cryptographic apparatus 20 turns to "IDLE". Otherwise, if it is determined that the command is not completed, Step 2 and Step 3 are repeated.

Figure 12:
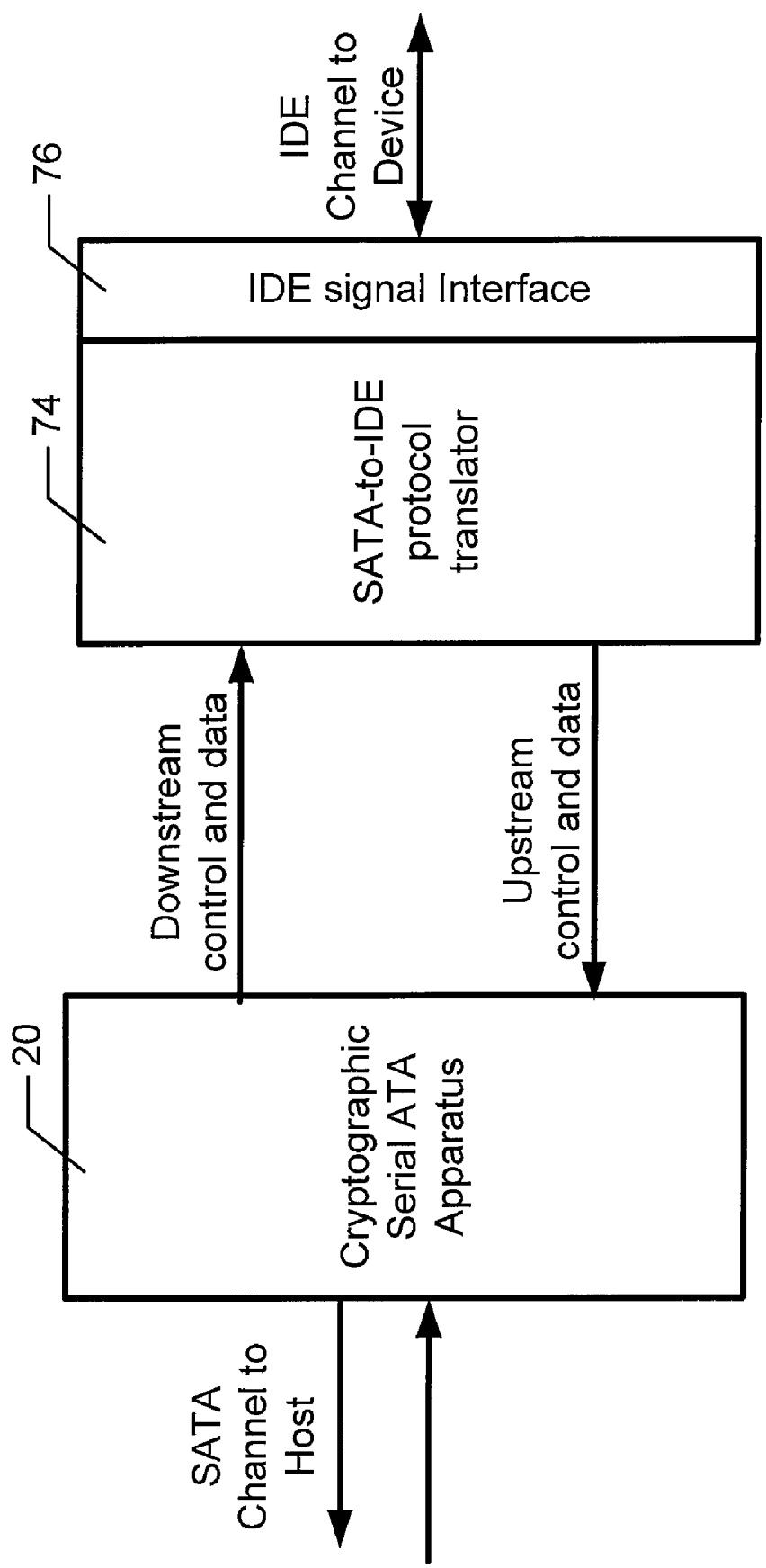
FIG. 12 schematically illustrates a cryptographic SATA-to-IDE implementation in accordance with the present invention.

FIG. 12 schematically illustrates a cryptographic SATA-to-IDE implementation in accordance with the present invention. Particularly, one side of serial ATA cryptographic apparatus 20 is operatively coupled to an IDE (Integrated Drive Electronics) signal interface 76 via a SATA-to-IDE protocol translator 74. IDE signal interface 76 provides an IDE channel to a device (not shown). Another side of serial ATA cryptographic apparatus 20 provides a SATA channel to a host (not shown), as generally depicted in FIG. 12. Serial ATA cryptographic apparatus 20 transmits downstream control and data signals to IDE signal interface 76 via SATA-to-IDE protocol translator 74. Serial ATA cryptographic apparatus 20 receives upstream control and data signals from IDE signal interface 76 via SATA-to-IDE protocol translator 74.

In one embodiment of FIG. 12, serial ATA cryptographic apparatus 20 is implemented according to the configuration generally illustrated in reference to FIG. 7. Specifically, ATA command filter 64 is provided on Transport layer 34. In another embodiment of FIG. 12, serial ATA cryptographic apparatus 20 is implemented according to the configuration generally illustrated in reference to FIG. 8. Particularly, ATA command filter 70 is provided on Link layer 32.

The above-described embodiments may be implemented in hardware and/or software form, as desired. Utilizing the cryptographic SATA apparatus of the present invention affords various advantages. For example, FIS analysis time is shortened. Additionally, hardware and software complexity is reduced. Moreover, there is no need to de-encapsulate all the data to determine whether encryption/decryption is necessary.

The disclosed cryptographic SATA apparatus and method readily distinguish data frames from non-data frames thereby making the overall cryptographic operation more efficient and less complex. In addition, the disclosed cryptographic SATA apparatus can encrypt/decrypt selected data streams received on its two (Serial ATA) interfaces. Additionally, the cryptographic SATA apparatus of FIG. 12 can encrypt/decrypt selected data streams received on both the Serial ATA and IDE interfaces. Alternative implementations may include a Serial ATA-to-USB (Universal Serial Bus) coupling that can encrypt/decrypt selected data streams received on both the Serial ATA and USB interfaces.

As generally described hereinabove, the various embodiments may be implemented in many commercial devices. Such devices may include, without limitation, internal hard disk drive, CDROM, DVDROM, CDRW, DVDRW, and Flash memory enclosures with Serial ATA interface; external hard disk drive, CDROM, DVDROM, CDRW, DVDRW, Flash memory enclosures with Serial ATA interface; Serial ATA-to-IDE/IDE-to-Serial ATA module; Serial ATA-to-USB/USB-to-Serial ATA module; Personal computer (PC), Notebook, laptop PC, tablet PC, etc.

A person skilled in the art would recognize that other components and/or configurations might be utilized in the above-described embodiments, if such other components and/or configurations do not depart from the intended purpose and scope of the present invention. Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to the preferred embodiments, it should be appreciated that various modifications and variations may be made in the present invention without departing from the scope or spirit of the invention. In this regard it is important to note that practicing the invention is not limited to the applications described hereinabove. Many other applications and/or alterations may be utilized provided that such other applications and/or alterations do not depart from the intended purpose of the present invention.

Also, features illustrated or described as part of one embodiment can be used in another embodiment to provide yet another embodiment such that the features are not limited to the specific embodiments described above. Thus, it is intended that the present invention cover all such embodi-

What is claimed is:

1. A cryptographic Serial ATA (SATA) apparatus, comprising:
   a SATA protocol stack for communicating with an interface of a device;
   a cryptographic engine operatively coupled to the SATA protocol stack for encrypting or decrypting at least a subset of data FISes (Frame Information Structures) communicated to or from the SATA protocol stack; and
   a main controller implemented at least partially in hardware, the main controller configured to cause:
      the SATA protocol stack to send at least first payload of a first data FIS to the cryptographic engine responsive to the first data FIS associated with a pre-defined category of command set;
      the cryptographic engine to decrypt at least a portion of the first payload received from the SATA protocol stack; and
      the SATA protocol stack to process a Register-Device to Host FIS without decryption responsive to receiving the Register-Device to Host FIS from the interface of the device.

2. The cryptographic SATA apparatus of claim 1, wherein the SATA protocol stack includes a Physical layer, a Link layer, and a Transport layer.

3. The cryptographic SATA apparatus of claim 2, further comprising an Application layer.

4. The cryptographic SATA apparatus of claim 3, wherein said cryptographic engine and said main controller operate at the Application layer.

5. The cryptographic SATA apparatus of claim 1, wherein said main controller is configured to send a signal to the cryptographic engine, the signal instructing whether to encrypt, decrypt, or bypass the data FISes received at the cryptographic engine.

6. The cryptographic SATA apparatus of claim 1, wherein said SATA protocol stack is operatively coupled to a USB (Universal Serial Bus) interface via a SATA-to-USB protocol translator.

7. The cryptographic SATA apparatus of claim 1, wherein the pre-defined category of command set comprises READ SECTOR command, READ SECTOR EXT command, READ MULTIPLE command, READ MULTIPLE EXT command, READ BUFFER command, READ DMA command, and READ DMA EXT command.

8. The cryptographic SATA apparatus of claim 1, wherein said main controller further causes:
   the SATA protocol stack to send at least second payload of a second data FIS to the cryptographic engine responsive to the second data FIS associated with the pre-defined category of command set;
   the cryptographic engine to encrypt at least a portion of the second payload; and
   the SATA protocol stack to send the encrypted portion of the second payload of the second data FIS to the interface of the device.

9. The cryptographic SATA apparatus of claim 8, wherein the pre-defined category of command set comprises WRITE SECTOR command, WRITE SECTOR EXT command, WRITE MULTIPLE command, WRITE MULTIPLE EXT command, WRITE BUFFER command, WRITE DMA command, and WRITE DMA EXT command.

10. The cryptographic SATA apparatus of claim 2, wherein said main controller receives signals from said Physical layer, said Link layer, or said Transport layer.

11. The cryptographic SATA apparatus of claim 10, wherein said received signals indicates types and commands of a FIS by analyzing the FIS at one of the Link layer and the Transport layer.

12. The cryptographic SATA apparatus of claim 10, wherein said received signals indicate data transfer directions.

13. The cryptographic SATA apparatus of claim 10, wherein said received signals include primitive detection indicator from said Link Layer and OOB (Out of Band) detection indicator from said Physical Layer.

14. The cryptographic SATA apparatus of claim 10, further comprising a FIS type detector at said Transport layer for detecting a type of a FIS decoded at the Link layer.

15. The cryptographic SATA apparatus of claim 14, wherein a type field is included in a first byte of a header of said FIS decoded at said Link layer.

16. The cryptographic SATA apparatus of claim 15, wherein the FIS type detector is configured to determine the FIS decoded at said Link Layer responsive to said type field having a hexadecimal value of 0x46, said main controller causing said decoded FIS to be sent to said cryptographic engine for encryption, decryption or bypassing.

17. The cryptographic SATA apparatus of claim 16, wherein the FIS type detector is configured to determine the FIS decoded at said Link Layer responsive to the type field not having a hexadecimal value of 0x46, said main controller causing said decoded FIS to bypass said at least one cryptographic engine.

18. The cryptographic SATA apparatus of claim 10, further comprising an ATA command filter for examining a command field of a Register-Host to Device FIS at said Transport layer.

19. The cryptographic SATA apparatus of claim 18, wherein a bypass control signal provided by said ATA command filter is logically ORed with a bypass preset signal in said main controller to generate a bypass flag signal, said at least one cryptographic engine responsive to the bypass flag signal to encrypt, decrypt or bypass a data FIS received by the cryptographic engine.

20. The cryptographic SATA apparatus of claim 10, further comprising a FIS type detector at said Link layer for determining whether a bit stream received from said Physical layer is part of a data FIS by determining a first descrambled byte value after a SOF (Start of Frame) primitive.

21. The cryptographic SATA apparatus of claim 20, wherein the FIS type detector determines that the bit stream is part of the data FIS responsive to the first descrambled byte having a hexadecimal value of 0x46.

22. The cryptographic SATA apparatus of claim 10, further comprising a FIS type detector at said Link layer for determining whether a bit stream received from said Physical layer is part of the data FIS by determining a first scrambled byte value after a SOF (Start of Frame) primitive.

23. The cryptographic SATA apparatus of claim 22, wherein the FIS type detector determines that the bit stream is part of the data FIS responsive to the first scrambled byte having a hexadecimal value of 0xCB.

24. The cryptographic SATA apparatus of claim 10, further comprising a FIS type detector at said Link layer for determining whether a bit stream received from said Physical layer is part of a data FIS responsive to an associated scrambler syndrome hexadecimal value being 0x8D.

25. The cryptographic SATA apparatus of claim 10, further comprising a FIS type detector at said Link layer for determining whether a bit stream received from said Physical layer is part of a data FIS responsive to a scrambled hexadecimal byte value being 0xCB.

26. The cryptographic SATA apparatus of claim 10, further comprising a FIS type detector at said Link layer for determining whether a bit stream received from said Physical layer is part of a data FIS by determining a first 10-bit character following a SOF (Start of Frame) primitive.

27. The cryptographic SATA apparatus of claim 26, wherein the FIS type detector determines the bit stream as part of the data FIS responsive to the first 10-bit character following a SOF primitive having a binary value of 1101000110.

28. The cryptographic SATA apparatus of claim 10, further comprising an ATA command filter for examining a command field of a FIS at said Link layer, the ATA command filter determining that a bit stream from the Physical layer is part of a Register-Host to Device FIS responsive to a first descrambled byte value after a SOF (Start of Frame) primitive having a hexadecimal value of 0x27.

29. The cryptographic SATA apparatus of claim 10, further comprising an ATA command filter for examining a command field of a FIS at said Link layer, the ATA command filter determining that a bit stream from the Physical layer is part of a Register-Host to Device FIS responsive to a first scrambled byte value after a SOF (Start of Frame) primitive having a hexadecimal value of 0xAA.

30. The cryptographic SATA apparatus of claim 10, further comprising an ATA command filter for examining a command field of a FIS at said Link layer, the ATA command filter determining that a bit stream from the Physical layer is part of a Register-Host to Device FIS responsive to a byte value with associated scrambler syndrome hexadecimal value being 0x8D.

31. The cryptographic SATA apparatus of claim 10, further comprising an ATA command filter for examining a command field of a FIS at said Link layer, the ATA command filter determining that a bit stream from the Physical layer is part of a Register-Host to Device FIS responsive to a scrambled hexadecimal byte value being 0xAA.

32. The cryptographic SATA apparatus of claim 10, further comprising an ATA command filter for examining a command field of a FIS at said Link layer, the ATA command filter determining that a bit stream from the Physical layer is part of a Register-Host to Device FIS responsive to a first 10-bit character following a SOF (Start of Frame) primitive having a binary value of 0101011010.

33. A cryptographic Serial ATA (SATA) apparatus, comprising:
a SATA device protocol stack for communicating with a host interface of a SATA host;
a SATA host protocol stack for communicating with a device interface of a SATA device;
a cryptographic engine operatively coupled between the SATA device protocol stack and the SATA host protocol stack for encrypting or decrypting at least a subset of data FISes (Frame Information Structures) communicated to or from the device interface; and
a main controller implemented at least partially in hardware, the main controller configured to cause:
the SATA host protocol stack to send at least first payload of a first data FIS to the cryptographic engine responsive to the first data FIS associated with a pre-defined category of command set;
the cryptographic engine to decrypt at least a portion of the first payload received from the SATA host protocol stack;
the SATA device protocol stack to send the decrypted portion of the first payload of the first data FIS to the host interface; and
the SATA device protocol stack to process a Register-Device to Host FIS to the host interface without decryption responsive to receiving the Register-Device to Host FIS from the device interface.

34. The cryptographic SATA apparatus of claim 33, wherein the pre-defined category of command set comprises READ SECTOR command, READ SECTOR EXT command, READ MULTIPLE command, READ MULTIPLE EXT command, READ BUFFER command, READ DMA command, and READ DMA EXT command.

35. The cryptographic SATA apparatus of claim 33, wherein said main controller further causes:
the SATA device protocol stack to send at least second payload of a second data FIS to the cryptographic engine responsive to the second data FIS associated with the pre-defined category of command set;
the cryptographic engine to encrypt at least a portion of the second payload; and
the SATA host protocol stack to send the encrypted portion of the second payload of the second data FIS to the device interface.

36. The cryptographic SATA apparatus of claim 35, wherein the data FIS not associated with the pre-defined category of command set carries command information.

37. The cryptographic SATA apparatus of claim 35, wherein the data FIS not associated with the pre-defined category of command set carries control information.

38. The cryptographic SATA apparatus of claim 35, wherein the data FIS not associated with the pre-defined category of command set carries status information.

39. The cryptographic SATA apparatus of claim 35, wherein the pre-defined category of command set comprises WRITE SECTOR command, WRITE SECTOR EXT command, WRITE MULTIPLE command, WRITE MULTIPLE EXT command, WRITE BUFFER command, WRITE DMA command, and WRITE DMA EXT command.

40. A cryptographic method, comprising the steps of:
a cryptographic SATA apparatus detecting a PIO (Programmed Input/Output) data-out command FIS (Frame Information Structure) received from a host interface;
said cryptographic SATA apparatus determining whether the received PIO data-out command FIS is associated with a pre-defined category of command set that requires setting in encryption mode;
said cryptographic SATA apparatus passing a PIO setup FIS received from a device interface to the host interface;
said cryptographic SATA apparatus detecting a data FIS payload received from said host interface;
said cryptographic SATA apparatus encrypting said detected data FIS payload; and
said cryptographic SATA apparatus detecting a Register-Device to Host FIS received from said device interface, said Register-Device to Host FIS representing completion of an operation or an aborted operation associated with the PIO data-out command FIS.

41. A cryptographic method, comprising the steps of:
a cryptographic SATA apparatus detecting a DMA (Direct Memory Access) data-in command FIS received from a host interface;

said cryptographic SATA apparatus determining whether the received DMA data-in command FIS is associated with a pre-defined category of command set that requires setting in decryption mode;

said cryptographic SATA apparatus detecting a data FIS payload being received from a device interface;

said cryptographic SATA apparatus decrypting said detected data FIS payload; and said cryptographic SATA apparatus detecting a Register-Device to Host FIS received from said device interface, said Register-Device to Host FIS representing completion of an operation or an aborted operation associated with the DMA data-in command FIS.

42. A cryptographic method in a cryptographic apparatus, comprising the steps of:

sending a PIO (Programmed Input/Output) data-out command FIS (Frame Information Structure) to an interface of a device without encryption;

receiving a PIO setup FIS from the interface of the device, the PIO setup FIS indicating whether the interface of the device is ready to receive data;

generating a first signal without decrypting the PIO setup FIS responsive to receiving the PIO setup FIS;

receiving a data payload responsive to sending the first signal;

encrypting at least a portion of the data payload responsive to the data payload associated with a pre-defined category of command set;

generating a data FIS based on the encrypted portion of the data payload;

sending the data FIS to the interface of the device;

receiving a Register-Device to Host FIS from the interface of the device; and generating and sending a second signal without decrypting the Register-Device to Host FIS, the second signal representing whether transmission of the encrypted portion of the data payload was successful.

43. The cryptographic method of claim 42, further comprising: setting to an encryption mode responsive to sending the PIO data-out command FIS.

44. The cryptographic method of claim 42, wherein the pre-defined category of command set comprises WRITE SECTOR command, WRITE SECTOR EXT command, WRITE MULTIPLE command, WRITE MULTIPLE EXT command, and WRITE BUFFER command.

45. The cryptographic method in a cryptographic apparatus, comprising the steps of:

receiving a PIO (Programmed Input/Output) data-out command FIS (Frame Information Structure) from an interface of a host;

sending a PIO setup FIS to the interface of the host, the PIO setup FIS indicating whether an interface of a device is ready to receive data;

receiving a data FIS from the interface of the host;

encrypting at least a portion of a data payload in the data FIS responsive to the data FIS associated with a pre-defined category of command set;

sending the encrypted portion of the data payload; and sending a Register-Device to Host FIS without decrypting the Register-Device to Host FIS, the Register-Device to Host FIS representing whether transmission of the encrypted portion of the data payload was successful.

46. The cryptographic method of claim 45, further comprising: setting to an encryption mode responsive to receiving the PIO data-out command FIS.

47. The cryptographic method of claim 45, wherein the pre-defined category of command set comprises WRITE SECTOR command, WRITE SECTOR EXT command, WRITE MULTIPLE command, WRITE MULTIPLE EXT command, and WRITE BUFFER command.

48. A cryptographic method in a cryptographic apparatus, comprising the steps of:

sending a DMA (Direct Memory Access) data-in command FIS (Frame Information Structure) to an interface of a device without encryption;

receiving a data FIS from the interface of the device;

decrypting at least a portion of a data payload in the data FIS responsive to the data FIS associated with a pre-defined category of command set;

generating and sending a first signal based on the decrypted portion of the data payload;

sending the decrypted portion of the data payload;

receiving a Register-Device to Host FIS from the interface of the device; and generating and sending a second signal without decrypting the Register-Device to Host FIS, the second signal representing whether transmission of the decrypted portion of the data payload was successful.

49. The cryptographic method of claim 48, further comprising setting to a decryption mode responsive to sending the DMA data-in command FIS.

50. The cryptographic method of claim 48, wherein the pre-defined category of command set comprises READ DMA command, and READ DMA EXT command.

51. The cryptographic method in a cryptographic apparatus, comprising the steps of:

receiving a DMA (Direct Memory Access) data-in command FIS (Frame Information Structure) from an interface of a host;

sending a first signal to the interface of the host, the first signal indicating whether an interface of a device is ready to send a data FIS;

decrypting at least a portion of a data payload in the data FIS responsive to the data FIS associated with a pre-defined category of command set;

generating a data FIS based on the decrypted portion of the data payload;

sending the data FIS to the interface of the host; and sending a Register-Device to Host FIS without decrypting the Register-Device to Host FIS, the Register-Device to Host FIS representing whether transmission of the decrypted portion of the data payload was successful.

52. The cryptographic method of claim 51, further comprising setting to a decryption mode responsive to receiving the DMA data-in command FIS.

53. The cryptographic method of claim 51, wherein the pre-defined category of command set comprises READ DMA command, and READ DMA EXT command.

* * * * *